US012118153B2

(12) United States Patent
Shi et al.

(10) Patent No.: US 12,118,153 B2
(45) Date of Patent: Oct. 15, 2024

(54) DYNAMIC GESTURE IDENTIFICATION METHOD, GESTURE INTERACTION METHOD AND INTERACTION SYSTEM

(71) Applicant: OmniVision Sensor Solution (Shanghai) Co., Ltd, Shanghai (CN)

(72) Inventors: Shunshun Shi, Shanghai (CN); Bin Wu, Shanghai (CN); Rui Jiang, Shanghai (CN); Qinyi Wang, Shanghai (CN); Wei Zhang, Shanghai (CN); Chao Gong, Shanghai (CN)

(73) Assignee: OmniVision Sensor Solution (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 18/241,395

(22) Filed: Sep. 1, 2023

(65) Prior Publication Data

US 2023/0418388 A1    Dec. 28, 2023

Related U.S. Application Data

(63) Continuation of application No. PCT/CN2021/093483, filed on May 13, 2021.

(30) Foreign Application Priority Data

Mar. 8, 2021    (CN) .......................... 202110252206.3

(51) Int. Cl.
*G06V 40/10*    (2022.01)
*G06F 3/01*    (2006.01)
(Continued)

(52) U.S. Cl.
CPC ............ *G06F 3/017* (2013.01); *G06V 10/751* (2022.01); *G06V 10/82* (2022.01); *G06V 40/10* (2022.01);
(Continued)

(58) Field of Classification Search
CPC ...... G06F 3/017; G06V 10/751; G06V 10/82; G06V 40/10; G06V 40/28; G06V 2201/07
See application file for complete search history.

(56) References Cited

U.S. PATENT DOCUMENTS

2016/0335861 A1* 11/2016 Shimura ................. H04N 7/188
2018/0189556 A1*  7/2018 Shamir ................... G06T 7/269
(Continued)

FOREIGN PATENT DOCUMENTS

CN          105844659 A     8/2016
CN          108961318 A    12/2018
(Continued)

*Primary Examiner* — Ming Y Hon
(74) *Attorney, Agent, or Firm* — IPRO, PLLC

(57) ABSTRACT

The present disclosure provides a dynamic gesture identification method, a gesture interaction method and an interaction system. The interaction system includes: a dynamic vision sensor configured to trigger an event in accordance with movement of an object in a field of view relative to the dynamic vision sensor, and output an event data flow; a hand detection module configured to process the received event data flow to determine an initial position of a hand; a hand tracking module configured to determine a series of state vectors in accordance with the initial position of the hand; a gesture identification module configured to create an event cloud in accordance with event data corresponding to the obtained state vector, and process the event cloud to identify the gesture; and a command execution module configured to execute a corresponding operating command in accordance with the identified gesture.

17 Claims, 6 Drawing Sheets

(51) Int. Cl.
  *G06V 10/75*  (2022.01)
  *G06V 10/82*  (2022.01)
  *G06V 40/20*  (2022.01)

(52) U.S. Cl.
  CPC .......... *G06V 40/28* (2022.01); *G06V 2201/07* (2022.01)

(56) References Cited

U.S. PATENT DOCUMENTS

| | | | |
|---|---|---|---|
| 2018/0295337 A1* | 10/2018 | Hicks | H04N 13/344 |
| 2019/0188460 A1* | 6/2019 | Zhang | G06F 3/0304 |
| 2019/0327124 A1* | 10/2019 | Lai | G01S 5/017 |
| 2020/0219276 A1 | 7/2020 | Bleyer et al. | |
| 2020/0387287 A1* | 12/2020 | Ravasz | G06F 3/011 |
| 2021/0042938 A1* | 2/2021 | Chen | G06V 20/46 |
| 2021/0409648 A1* | 12/2021 | Kallakuri | G06N 5/01 |
| 2022/0035441 A1* | 2/2022 | Yu | G06F 18/251 |
| 2022/0036565 A1* | 2/2022 | Varadarajan | G06T 7/0002 |
| 2022/0083770 A1* | 3/2022 | Zhao | G06V 20/64 |
| 2022/0132078 A1* | 4/2022 | Engheben | H04N 25/75 |
| 2022/0269926 A1* | 8/2022 | Pavlov | G06N 3/044 |
| 2023/0214458 A1* | 7/2023 | Marsden | G06V 40/11 |
| | | | 382/157 |

FOREIGN PATENT DOCUMENTS

| | | |
|---|---|---|
| CN | 109492609 A | 3/2019 |
| CN | 109544590 A | 3/2019 |
| CN | 110503686 A | 11/2019 |

\* cited by examiner

DYNAMIC GESTURE IDENTIFICATION METHOD, GESTURE INTERACTION METHOD AND INTERACTION SYSTEM

TECHNICAL FIELD

The present disclosure relates to the field of computer vision technology, in particular to a dynamic gesture identification method, a gesture interaction method and an interaction system.

BACKGROUND

Human-machine interactive system is used to help a user to achieve such functions as information management, service management and data processing based on understanding and communication between the user and a computer. The human-machine interaction has developed very fast from an initial human-machine interaction system based on a conventional hardware device, e.g., mouse or keyboard, to a human-machine interaction system based on computer vision.

Typically, the human-machine interaction systems based on computer vision include an interaction system based on speech recognition, e.g., Siri from Apple Inc., an interaction system based on movement identification, e.g., Kinect from Microsoft Corporation, and an interaction system based on eyeball, e.g., Magic Leap One AR spectacles from Magic Leap. For the human-machine interaction based on movement recognition, a commonly-used method includes detecting and tacking a hand in an image, extracting a hand feature to describe a static gesture, and executing a corresponding command in accordance with the static gesture. However, this method is limited by a data frame rate, so a response time is relatively long. In addition, due to a complex process, a large computation burden and large power consumption occur for this method. Moreover, a conventional human-machine interaction system needs to be integrated with a hardware platform, so the installation there of is complicated.

Based on the above, there is an urgent need to provide a new human-machine interaction scheme based on the identification of a dynamic gesture.

SUMMARY

An object of the present disclosure is to provide a dynamic gesture identification method, a gesture interaction method and an interaction system, so as to solve or at least alleviate at least one of the above-mentioned problems.

In one aspect, the present disclosure provides in some embodiments a dynamic gesture tracking method, including: processing an event data flow from a dynamic vision sensor at a predetermined time interval so as to generate a series of event cumulative graphs; determining an initial position of a hand in accordance with the event cumulative graphs; determining a hand measurement position in an initial frame in accordance with the initial position of the hand, the initial frame being a next event cumulative graph adjacent to an event cumulative graph corresponding to the initial position of the hand; and determining a state vector indicating a movement state of the hand in each event cumulative graph in accordance with the initial position of the hand and the hand measurement position.

In a possible embodiment of the present disclosure, the determining the initial position of the hand in accordance with the event cumulative graphs includes: determining a high-energy density point in a current event cumulative graph; determining at least one hand detection region in the event cumulative graph through a target detection network; generating at least one rectangular region with the high-energy density point as a center in accordance with a size of the hand detection region; calculating an overlapping ratio of the rectangular region to the hand detection region; in the case that the overlapping ratio is greater than a predetermined value, taking a position where the high-energy density point is located as the initial position of the hand; and in the case that the overlapping ratio is not greater than the predetermined value, calculating a high-energy density point and a hand detection region in a next event cumulative graph, and determining the initial position of the hand in accordance with an overlapping ratio of the hand detection region to the rectangular region.

In a possible embodiment of the present disclosure, the determining the high-energy density point in the current event cumulative graph includes: generating an energy density graph in accordance with the current event cumulative graph and at least one event cumulative graph adjacent to the current event cumulative graph; dividing the energy density graph into a plurality of regions having a same size; determining an energy density in each region in accordance with a sum of pixel values in the region and the quantity of non-zero pixels; removing regions where the energy density does not meet a predetermined condition from the regions, so as to obtain remaining regions; and selecting a region having a largest energy density in the remaining regions, and calculating an average value of coordinate values of the pixels in the region as the high-energy density point.

In a possible embodiment of the present disclosure, the determining the hand measurement position in the initial frame in accordance with the initial position of the hand includes: determining a first search region in the initial frame in accordance with the initial position of the hand; updating the first search region iteratively through determining whether event data in the initial frame is located within the first search region, so as to obtain at least one new first search region; obtaining a set of first search regions in accordance with the first search region and all the new first search regions; and determining the hand measurement position in accordance with the quantity of all event data in the set of first search regions and coordinate positions of the event data.

In a possible embodiment of the present disclosure, the updating the first search region iteratively through determining whether the event data in the initial frame is located within the first search region so as to obtain at least one new first search region includes: determining whether each piece of event data in the initial frame is located within the first search region in an output sequence of the pieces of event data, and determining in real time the quantity of pieces of event data in the first search region; in the case that the quantity of pieces of event data in the first search region is greater than an update frequency threshold, updating the first search region so as to obtain the new first search region and a search center; and determining whether the other pieces of event data in the initial frame is located within the new first search region, and determining the quantity of pieces of event data in the new first search region until all pieces of event data in the initial frame have been traversed.

In a possible embodiment of the present disclosure, the determining the hand measurement position in accordance with the quantity of all event data in the set of first search regions and coordinate positions of the event data includes determining an average value of the coordinate positions of the event data as the hand measurement position in accordance with the quantity of all event data in the set of first search regions and coordinate positions of the event data.

In a possible embodiment of the present disclosure, the determining the first search region in the initial frame in accordance with the initial position of the hand includes generating a square region in the initial frame with the initial position of the hand as a center and with a short side or a long side of the hand detection region being magnified by predetermined times as a side, so as to obtain the first search region.

In a possible embodiment of the present disclosure, the determining the state vector indicating the movement state of the hand in each event cumulative graph in accordance with the initial position of the hand and the hand measurement position includes: determining a predicted state vector and a hand measurement position in the initial frame in accordance with the initial position of the hand and the hand measurement position; adjusting the predicted state vector in the initial frame in accordance with the hand measurement position in the initial frame, so as to obtain a state vector in the initial frame; calculating a predicted state vector and a hand measurement position in a current event cumulative graph with the initial frame as a start point in accordance with a state vector in a previous event cumulative graph; and adjusting the predicted state vector in the current event cumulative graph in accordance with the hand measurement position in the current event cumulative graph, until the state vector is determined in each event cumulative graph.

In a possible embodiment of the present disclosure, the processing the event data flow from the dynamic vision sensor at the predetermined time interval so as to generate a series of event cumulative graphs includes: dividing the event data flow from the dynamic vision sensor at the predetermined time interval so as to obtain a plurality of data segments; and generating a series of event cumulative graphs in accordance with event data in each data segment.

In a possible embodiment of the present disclosure, the event data is triggered by movement of an object in a field of view relative to the dynamic vision sensor, and the event data includes a coordinate position and a timestamp of a triggered event. The generating a series of event cumulative graphs in accordance with the event data in each data segment includes: creating an initial image having a predetermined size, and assigning pixel values of the initial image as zero, the predetermined size being determined in accordance with a size of a pixel unit array of the dynamic vision sensor; determining the quantity of times for which an event at a same position as a coordinate position of each pixel in the initial image is triggered within the data segment; and updating a pixel value of each pixel in accordance with the quantity of times, so as to generate the event cumulative graph.

In another aspect, the present disclosure provides in some embodiments a dynamic gesture identification method, including: obtaining a series of state vectors indicating a movement state of a hand through the above-mentioned dynamic gesture tracking method; creating an event cloud in accordance with event data corresponding to the state vectors; and processing the event cloud through a point cloud-based neural network so as to identify a gesture.

In a possible embodiment of the present disclosure, the creating the event cloud in accordance with the event data corresponding to the obtain state vectors includes: generating an event vector corresponding to each event cumulative graph in accordance with the event data corresponding to the state vector; and creating the event cloud through a first quantity of adjacent event vectors.

In a possible embodiment of the present disclosure, the generating the event vector corresponding to each event cumulative graph in accordance with the event data corresponding to the state vector includes: generating a second search region with the event data corresponding to the state vector as a center; sampling event data in the second search region so as to obtain a second quantity of pieces of event data; and generating the event vector corresponding to each event cumulative graph in accordance with the second quantity of pieces of event data.

In yet another aspect, the present disclosure provides in some embodiments a gesture interaction method, including: identifying a current gesture of a user through the above-mentioned dynamic gesture identification method; and executing a corresponding operation command in accordance with the identified gesture.

In still yet another aspect, the present disclosure provides in some embodiments an interaction system, including: a dynamic vision sensor configured to trigger an event in accordance with movement of an object in a field of view relative to the dynamic vision sensor, and output an event data flow; a hand detection module configured to process the received event data flow to determine an initial position of a hand; a hand tacking module configured to determine a series of state vectors indicating a movement state of the hand in the event data flow in accordance with the initial position of the hand; a gesture identification module configured to create an event cloud in accordance with event data corresponding to each state vector, and process the event cloud through a point cloud-based neural network, so as to identify a gesture; and a command execution module configured to execute a corresponding operation command in accordance with the gesture.

In a possible embodiment of the present disclosure, the hand detection module is further configured to generate a detection region for detecting the hand in accordance with the state vector.

In a possible embodiment of the present disclosure, the interaction system further includes a resetting module configured to, in the case that the hand fails to be detected by the hand detection module within a predetermined time period, indicate the hand detection module to enlarge the detection region, and in the case that the hand has been detected, reset the initial position of the hand.

In still yet another aspect, the present disclosure provides in some embodiments a computing device, including one or more processors, a memory, and one or more programs stored in the memory and executed by the one or more processors. The one or more programs is executed by the one or more processors so as to implement any one of the above-mentioned methods.

In still yet another aspect, the present disclosure provides in some embodiments a computer-readable storage medium storing therein one or more programs. The one or more programs is executed by a computer so as to implement any one of the above-mentioned methods.

In still yet another aspect, the present disclosure provides in some embodiments an intelligent device including the above-mentioned interaction system.

According to the embodiments of the present disclosure, a series of event cumulative graphs are generated in accordance with the event data flow from the dynamic vision sensor, the event cumulative graphs are processed to determine the initial position of the hand, and the initial frame is determined in accordance with the initial position of the hand, so as to dynamically track and identify the gesture. As a result, it is able to achieve the human-machine interaction without any image processing step, thereby to remarkably improve the speed and accuracy of the gesture identification.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Recently, a Dynamic Vision Sensor (DVS) has attracted more and more attentions in the field of computer vision technology. The DVS is a biologically-mimic vision sensor for simulating a pulse-triggered neuron-based human retina, and it is provided with an array consisting of a plurality of pixel units. Each pixel unit may respond to and record an area where a light intensity changes rapidly merely when a light intensity change has been sensed. In other words, each pixel unit in the DVS independently responds to and records the area where the light intensity changes rapidly. An event-triggered processing mechanism is adopted by the DVS, and the pixel unit is triggered to generate event data only when an object in a field of view moves relative to the DVS, so the DVS may output an asynchronous event data flow rather than an image. The event data flow may be, for example, light intensity change information (e.g., a timestamp of the light intensity change and a light intensity threshold) and a coordinate position of a triggered pixel unit.

Based on the above-mentioned operating principle, it is found that, as compared with a conventional vision sensor, the DVS has the following advantages. 1) The DVS is capable of detecting a high-speed object moving at a speed of up to ten thousand frames per second, without any restraint from an exposure time and a frame rate. 2) The DVS has a larger dynamic range, and it is capable of accurately sensing and output a scenario change even in a low-light or highly-exposed environment. 3) The DVS has lower power consumption. 4) Each pixel unit in the DVS responds to the light intensity change independently, so the DVS is not affected by motion blur.

Considering such problems in the related art as long response time, large computation burden, large power consumption and complicated installation, an object of the present disclosure is to provide a human-machine interaction scheme based on dynamic gesture identification, so as to process the event data flow from the DVS through an algorithm, and rapidly detect and identify a hand, thereby to accurately achieve the human-machine interaction.

Figure 1:
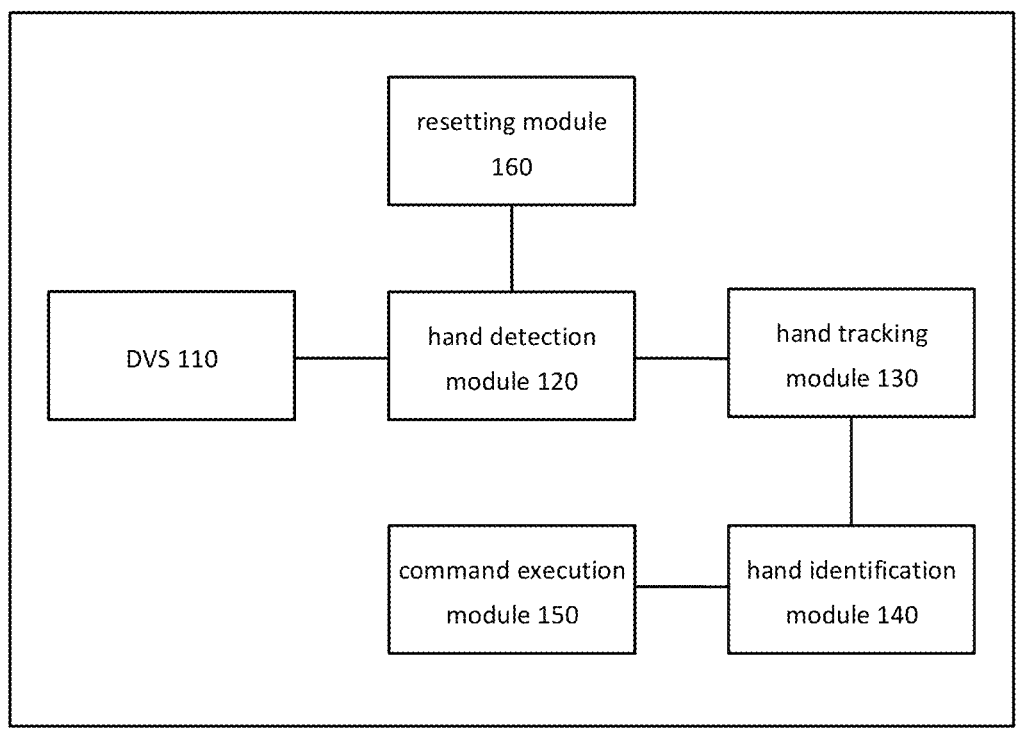
FIG. 1 is a schematic view showing an interaction system 100 according to one embodiment of the present disclosure.

FIG. 1 shows an interaction system 100 according to one embodiment of the present disclosure. As shown in FIG. 1, apart from desired configurations (e.g., a display panel), the interaction system 100 includes a DVS 110, a hand detection module 120, a hand tracking module 130, a gesture identification module 140 and a command execution module 150. It should be appreciated that, the modules in FIG. 1 are for illustrative purposes only, and the quantity of the modules in the interaction system 100 will not be particularly defined herein.

The DVS 110 monitors in real time a change in movement of an object (e.g., person or any other animal) in a field of view. Once the object moves in the field of view relative to the DVS 110 (i.e., light in the field of view changes), a pixel event (also called as event for short) is triggered, and then the DVS outputs event data about a dynamic pixel (i.e., a pixel unit whose brightness changes). Several pieces of event data outputted within a certain time period form an event data flow. Each piece of event data in the event data flow at least includes a coordinate position of the triggered event (i.e., the pixel unit whose brightness changes) and timestamp information about a time when the event is triggered. A specific structure of the DVS 110 will not be particularly defined herein.

The DVS 110 outputs the event data flow to the hand detection module 120, and the hand detection module 120 processes the event data flow to determine an initial position of a hand.

In the embodiments of the present disclosure, pieces of event data in the event data flow are outputted in a chronological order. The hand detection module 120 slices the event data flow from the DVS 110 at a predetermined time interval so as to obtain a series of time slices, processes each time slice to generate the event cumulative graph representing movement information in the field of view, and processes the event cumulative graph so as to determine the initial position of the hand.

Once the initial position of the hand has been determined, the interaction system 100 is activated to enter a hand tracking mode.

According to the embodiments of the present disclosure, it is able for a user to conveniently activate the interaction system 100 through making an operation, e.g., waving the hand, in front of a camera, rather than a static gesture.

After determining the initial position of the hand, on one hand, the interaction system 100 displays the initial position of the hand in real time on a display panel (e.g., in the form of a dot), and generates an operable region surrounding the initial position of the hand. When the user is located at a fixed position and merely moves the hand, the entire operable region is covered. In this way, it is unnecessary for the user to make exaggerated movement to operate the human-machine interaction system.

On the other hand, the hand tracking module 130 tracks the hand from a next event cumulative graph adjacent to an event cumulative graph corresponding to the initial position of the hand. In a possible embodiment of the present disclosure, the hand tracking module 130 determines a series of state vectors indicating a movement state of the hand in the subsequent event cumulative graphs through Kalman filtering in accordance with the initial position of the hand. Usually, one state vector is determined with respect to one event cumulative graph. The state vector at least includes a coordinate position and a movement speed of the hand.

When the hand tracking module 130 tracks movement state of the hand, the gesture identification module 140 identifies a gesture of the hand. In a possible embodiment of the present disclosure, the gesture identification module 140 creates an event cloud in accordance with event data corresponding to the obtained state vector, and processes the event cloud through a point cloud-based neural network so as to identify the gesture. The gestures are defined when training the neural network, and in the embodiment of the present disclosure, the gestures are some dynamic gestures, for example, waving the hand in different directions such as upward, downward, leftward, rightward, forward, backward, etc., or transforming different gestures such as fist, OK or V and so on.

The command execution module 150 performs a corresponding operation command in accordance with the identified gesture. In a possible embodiment of the present disclosure, the dynamic gestures include waving up and down, waving from side to side, rotating leftward and rotating rightward, which correspond to "enter", "return", "turn up" and "turn down" respectively.

In some other embodiments of the present disclosure, the hand tracking module 130 fails to track the hand due to shielding or an interference from an external environment. When the hand is lost, the interaction system 100 needs to be reset or the position of the hand needs to be initialized again.

At this time, the interaction system 100 further includes a resetting module 160 coupled to the hand detection module 120, as shown in FIG. 1.

During the tracking, the hand detection module 120 is further configured to generate a detection region in accordance with the state vector, with a coordinate position of the hand in the vector state as a tracking center, so as to continuously detect the hand surrounding the tracking center. Usually, the hand detection module 120 detects the hand in the detection region through a target detection network. When the hand has been detected, the target detection network outputs one or more hand detection rectangles. When the hand fails to be detected, it is considered that the tracking fails.

In a possible embodiment of the present disclosure, a predetermined time period t1 is set, and when the hand fails to be detected within the predetermined time period, the interaction system 100 enters a resetting mode.

The resetting module 160 is configured to indicate the hand detection module to enlarge the detection region for detecting the hand when the hand detection module 120 fails to detect the hand within the predetermined time period (i.e., t1). In a possible embodiment of the present disclosure, the enlarged detection region has a same size as the operable region. When the hand detection module 120 has detected the hand in the enlarged detection region, the initial position of the hand is reset. In a possible embodiment of the present disclosure, the hand detection module 120 may detect more than one hand, i.e., there is more than one hand detection rectangles. Usually, the resetting module 160 calculates a distance between a previous tracking result and a center of each hand detection rectangles, and takes the center of the hand detection rectangle closest to the previous tracking result as the reset initial position of the hand.

In addition, a time threshold t2 is further set, and when the hand fails to be detected within a time period greater than t2, it is considered that the hand is lost completely and the initialization is performed again. As mentioned hereinabove, the hand detection module 120 processes the event data flow again at the predetermined time interval, so as to determine the initial position of the hand.

According to the interaction system 100 in the embodiments of the present disclosure, the event data flow from the DVS 110 is processed to determine the initial position of the hand rapidly, and the gesture is dynamically tracked and identified in accordance with the initial position of the hand and the initial frame. As a result, it is able to accurately achieve the human-machine interaction without any complicated processing on an image, thereby to identify the dynamic gesture rapidly.

Further, the event cumulative graph generated in accordance with the event data flow merely includes contour information about the object rather than any useless information such as an environmental background, so it is able to remarkably improve the identification accuracy of the dynamic gesture.

Usually, the interaction system 100 is applied to an intelligent device where the interaction is performed on the basis of the gesture, so as to improve the user experience.

The intelligent device includes a general-purpose device, e.g., a mobile terminal or a personal digital terminal. At this time, one or more interaction systems 100 is used for interaction, or for controlling peripherals of the intelligent device.

The intelligent device further includes a specific-purpose device, e.g., an intelligent loudspeaker box, or an intelligent display device. At this time, the interaction system 100 is used for controlling the intelligent device.

The intelligent device further includes various Internet of Things (IoT) devices or Artificial Intelligence and Internet of Things (AIoT) devices. At this time, the interaction system 100 is used for interaction, so as to achieve the distribution of the devices in a more intensive and more intelligent manner.

The intelligent device is used in a vehicle as a vehicle-mounted device for intelligent driving.

The intelligent device is further used in household appliances or entertainment devices, e.g., an intelligent loudspeaker box, an intelligent air conditioner, an intelligent refrigerator or an intelligent display device. At this time, the interaction system 100 is used for interaction and controlling.

In addition, the intelligent device is also used in the industrial field, e.g., industrial control equipment, a sensing device, an IoT device, an AIoT device or a braking device. At this time, the interaction system 100 is sued for interaction and controlling.

The above description about the intelligent device is for illustrative purposes only, and the intelligent device is not limited thereto, i.e., all the intelligent devices having an interaction processing capability of a data processing capability through the system fall within the scope of the present disclosure.

Figure 2:
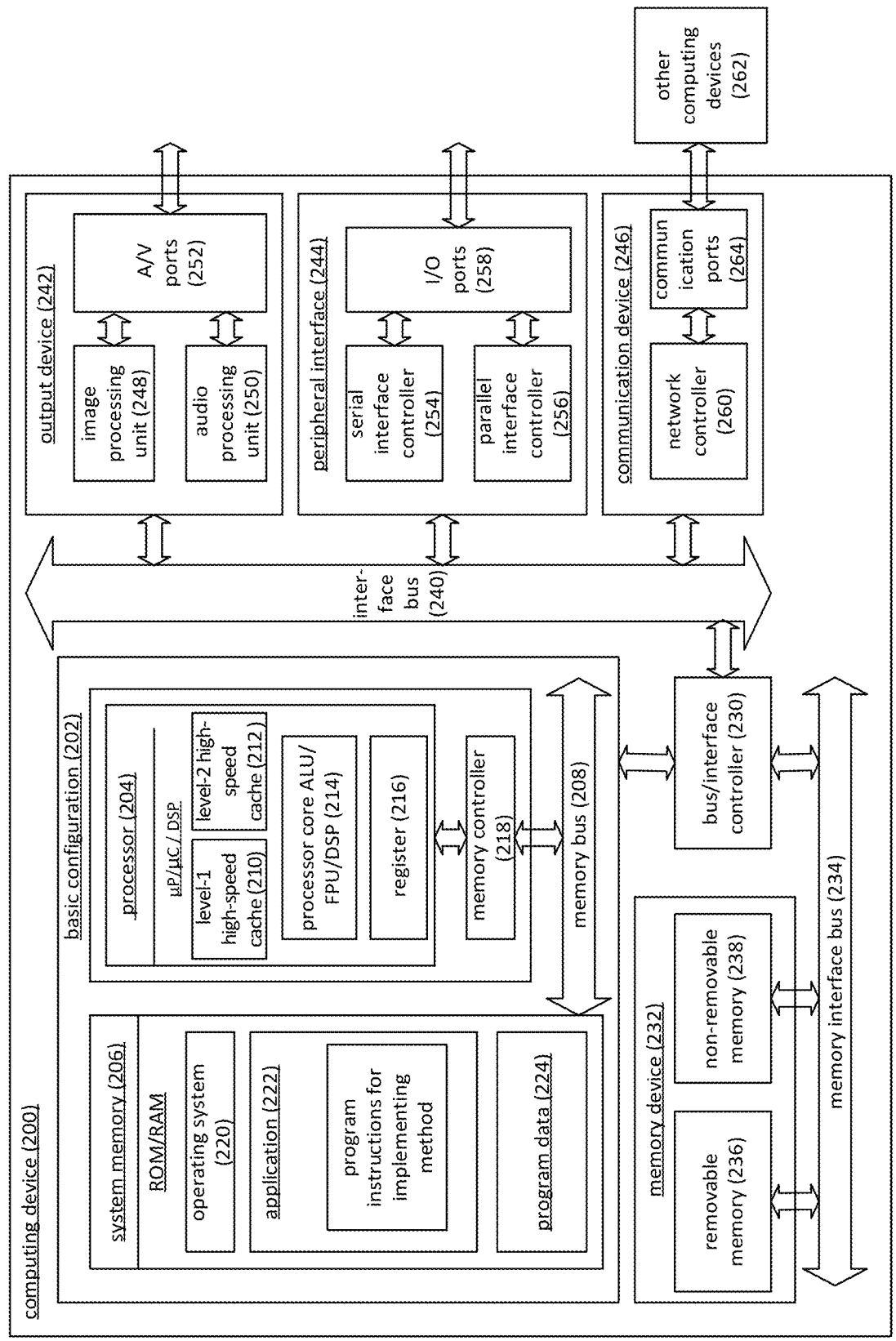
FIG. 2 is a schematic view showing a computing device 200 according to one embodiment of the present disclosure.

As shown in FIG. 2, the present disclosure further provides in some embodiments a computing device 200 for the interaction system 100.

As shown in FIG. 2, in a basic configuration 202, the computing device 200 typically includes a system memory 206 and one or more processors 204. The one or more processors 204 communicates with the system memory 206 via a memory bus 208.

Depending on a desired configuration, the processor 204 may be of any type, and it may include, but not limited to, microprocessor (μP), microcontroller (μC), Digital Signal Processor (DSP), or a combination thereof. The processor 204 may include one or more levels of high-speed caches (e.g., a level-1 high-speed cache 210 and a level-2 high-speed cache 212), a processor core 214 and a register 216. The processor core 214 may include an Arithmetic Logical Unit (ALU), a Float Point Unit (FPU), a DSP core, or a combination thereof. A memory controller 218 may be used together with the processor 204, or in some embodiments of the present disclosure, the memory controller 218 may be an internal component of the processor 204.

Depending on a desired configuration, the system memory 206 may be of any type, and it may include, but not limited to, volatile memory (e.g., Random Access Memory (RAM)), non-volatile memory (e.g., Read Only Memory (ROM) or flash memory), or a combination thereof. The system memory 206 may include an operating system 220, one or more applications 222, and program data 224. In some embodiments of the present disclosure, the application 222 may be operated using the program data 224 on the operating system.

The computing device 200 further includes a storage device 232, which includes a removable memory 236 and an unremovable memory 238 coupled to each other via a memory interface bus 234.

The computing device 200 may further include an interface bus 240 for the communication between various interface devices (e.g., an output device 242, a peripheral interface 244 and a communication device 246) and the basic configuration 102 via a bus/interface controller 230. The output device 242 may include a graphical processing unit 248 and an audio processing unit 250, which are configured to facilitate the communication with various external devices, e.g., display and loudspeaker, via one or more A/V ports 152. The peripheral interface 244 may include a serial interface controller 254 and a parallel interface controller 256, which are configured to facilitate the communication with the external devices, such as input devices (e.g., keyboard, mouse, stylus, voice input device and touch device) or the other devices (e.g., printer or scanner) via one or more I/O ports 258. The communication device 246 may include a network controller 260, which is configured to communicate with one or more other computing devices 262 using a network communication link via one or more communication ports 264.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

Usually, the computing device 200 may be a part of a small-size portable (or mobile) electronic device, e.g., cellular phone, digital camera, PDA, Personal Media Player, wireless network browser, head-mounted device, application-specific device, or a device including the above functions. In a possible embodiment of the present disclosure, the computing device 200 may be a micro computing module, which will not be particularly defined herein.

In the embodiments of the present disclosure, the computing device 200 is configured to implement any of the above-mentioned methods. The application 222 in the computing device 200 includes a plurality of program instructions for implementing any of the above-mentioned methods.

Figure 3:
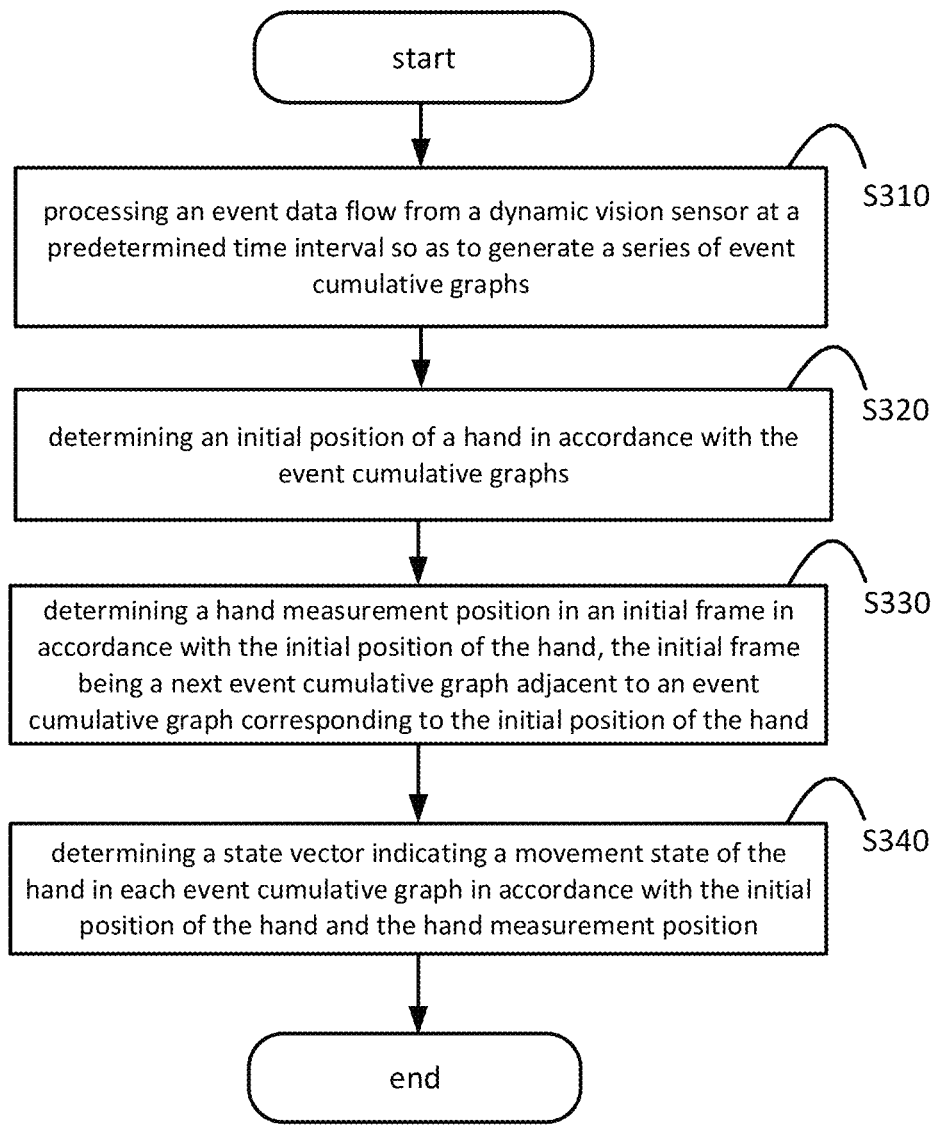
FIG. 3 is a flow chart of a dynamic gesture tracking method 300 according to one embodiment of the present disclosure.

As shown in FIG. 3, the present disclosure further provides in some embodiments a dynamic gesture tracking method 300. It should be appreciated that, the implementation of the method 300 may refer to that of the system 100, which will not be particularly defined herein.

As shown in FIG. 3, the method 300 includes the following steps.

Step S310: processing an event data flow from a DVS at a predetermined time interval so as to generate a series of event cumulative graphs.

In a possible embodiment of the present disclosure, the event data flow from the DVS 110 is divided by the predetermined time interval to obtain a plurality of data segments (i.e., time slices). When a change in light intensity of a pixel unit (x, y) at a time point t exceeds a threshold, event data (x, y, t) is generated, where (x, y) represents a coordinate position of the event data (i.e., the triggered pixel unit), and t represents information about a timestamp of the triggered event data.

All the triggered event data forms the event data flow. Usually, the event data flow is sliced into the data segments through setting a predetermined time interval $\Delta t$. When a timestamp of a first piece of triggered event data is $T_1$, a time period of the event data in a first data segment ranges from $T_1$ to $T_1+\Delta t$, and a time period of the event data in an $i^{th}$ data segment ranges from $T_1+(i-1)\times\Delta t$ to $T_1+i\times\Delta t$.

Then, a series of event cumulative graphs are generated in accordance with the event data in each data segment. In a possible embodiment of the present disclosure, the generating the event cumulative graph in accordance with the event data in each data segment includes the following steps.

In a first step, an initial image having a predetermined size is created, and pixel values of the initial image are assigned as zero. The predetermined size is determined in accordance with a size of a pixel unit array of the DVS 110. For example, when the size of the pixel unit array is 20*30, the size of the initial image is also 20*30. In other words, pixels in the initial image correspond to pixel units in the pixel unit array respectively.

In a second step, the quantity of times for which an event at a same position as a coordinate position of each pixel in the initial image is triggered within the data segment is determined. In other words, the quantity of times for which the event data is triggered within the data segment is determined at each pixel in the initial image. When a coordinate position of a pixel within the $i^{th}$ data segment is (x, y), the corresponding event data is marked as $e(x, y, t_j)$, where $t_j$ ranges from $T_1+(i-1)\times\Delta t$ to $T_1+i\times\Delta t$.

In a third step, a pixel value of each pixel is updated in accordance with the quantity of times, so as to generate the event cumulative graph. The event cumulative graph $I_T$ is expressed as $I_T(x,y)=a \times n$, where (x,y) represents coordinates of the pixel, $I_T(x,y)$ represents the pixel value at (x,y), n represents the quantity of times for which the event data is triggered at (x,y), and a is a constant set in accordance with the quantity of times and the pixel value. In a possible embodiment of the present disclosure, the pixel value in the event cumulative graph has a maximum value of 255 and a minimum value of 0.

Based on the above, the event cumulative graph generated in accordance with the event data merely includes information about the triggered pixel units rather than irrelevant background information, and a data volume of the event cumulative graph is less than that of a conventional image, so it is able to facilitate the subsequent processing.

Step S320: determining an initial position of a hand in accordance with the event cumulative graphs.

In a possible embodiment of the present disclosure, from a first event cumulative graph, each event cumulative graph is processed as follows until the initial position of the hand is determined.

At first, a high-energy density point in the event cumulative graph is determined as follows.

1) An energy density graph is generated in accordance with a current event cumulative graph and at least one event cumulative graph adjacent to the current event cumulative graph. As an example, the energy density graph is generated in accordance with the current event cumulative graph and previous four event cumulative graphs adjacent to it, the energy density graph is expressed as $F_i = b1 \times F_{i-4} + b2 \times F_{i-3} + b3 \times F_{i-2} + b4 \times F_{i-1} + b5 \times F_i$, where b1, b2, b3, b4 and b5 are set according to the practical need, and $F_i$ represents an $i^{th}$ event cumulative graph.

It should be appreciated that, the above is merely for illustrative purposes, and the energy density graph may be generated in accordance with the current event cumulative graph and any quantity of previous event cumulative graphs.

2) The energy density graph is divided into a plurality of regions having a same size.

In a possible embodiment of the present disclosure, each of the event cumulative graph and the energy density graph has a size of 1280*800 (i.e., a width of 1280 pixels and a height of 800 pixels), and the energy density graph is equally divided into 40*25 regions, i.e., each region has a width of 32 pixels and a height of 32 pixels.

It should be appreciated that, the size of each region will not be particularly defined herein. When the energy density graph has a smaller size and the quantity of regions remains unchanged, the length and the width of each region may be scaled down proportionally. For example, when the energy density graph has a size of 640*400 and it is still divided into 40*25 regions, each region has a size of 16*16.

3) An energy density is calculated in each region. For a jth region, the energy density $u_j$ is determined in accordance with a sum $S_j$ of pixel values in the region and the quantity $N_j$ of non-zero pixels. In a possible embodiment of the present disclosure, a quotient of $S_j$ to $N_j$ is taken as the energy density, i.e., $u_j = S_j/N_j$.

4) A maximum energy density threshold is set, and regions whose energy density does not meet a predetermined condition (i.e., exceeds the maximum energy density threshold) are removed from all the regions to obtain remaining regions. This has the advantage of filtering out regions where the energy density is greater than the maximum energy density threshold to prevent the interference from a region with large light intensity.

5) A region having a largest energy density is selected in the remaining regions, and an average value of coordinate values of the pixels in the region is calculated as the high-energy density point. In a possible embodiment of the present disclosure, the high-energy density point is calculated through $x = \Sigma x_i/N$ and $y = \Sigma y_i/N$, where x represents an abscissa of the high-energy density point, y represents an ordinate of the high-energy density point, $x_i$ represents an abscissa of an $i^{th}$ pixel in the selected region, y represents an ordinate of the $i^{th}$ pixel in the selected region, and N represents the quantity of pixels in the selected region.

Then, at least one hand detection region is determined in the event cumulative graph through the target detection network.

In the embodiments of the present disclosure, the target detection network is a neutral network based on deep learning, and it is obtained through training. Usually, a training sample set consisting of event cumulative graphs are labeled with a label of hand, and the target detection network is trained in accordance with the training sample set and the label so as to obtain an optimum detector.

The current event cumulative graph is inputted into the target detection network, and the target detection network outputs one or more detection rectangles, i.e., hand detection regions, so as to obtain one or more hands. Usually, the hand detection region is a rectangular region defined by four parameters, i.e., coordinates $P_l$ of an upper left corner, coordinates $P_r$ of a lower right corner, confidence c and a label l. In this way, it is able to determine the hand detection region, thereby to determine a length and a width of the hand detection region.

Through the above-mentioned steps, one high-energy density point and one or more hand detection regions are obtained, and at least one rectangular region having a same size as the hand detection region is generated with the high-energy density point as a center. That is, the generated rectangular region is centred on the high-energy density point, and the width and height of the rectangular region are consistent with the width and height of the hand detection region.

When there is more than one hand detection region, more than one rectangular region is generated. At this time, an overlapping rate of each rectangular region to the corresponding hand detection region is calculated. It should be appreciated that, when there is merely one rectangular region (i.e., there is merely one hand detection region), it is merely necessary to calculate the overlapping rate of the rectangular region to the hand detection region.

In a possible embodiment of the present disclosure, the overlapping rate $\sigma$ is calculated through $$\sigma = \frac{\text{area }(O)}{\text{area }(P) + \text{area }(Q) - \text{area }(O)},$$

where area(P) represents an area of the hand detection region, area(Q) represents an area of the rectangular region, and area(O) represents an area of an overlapping region between the rectangular region and the hand detection region.

When the overlapping rate is greater than a predetermined threshold, it means that there is a hand in the vicinity of the high-energy density point, and the position of the high-energy density point is taken as the initial position of the hand.

When the overlapping rate is not greater than the predetermined value, with respect to the next event cumulative graph, the high-energy density point and the hand detection region are calculated, the rectangular region is determined, and then the initial position of the hand is determined in accordance with the overlapping rate of the hand detection region to the rectangular region.

After the initial position of the hand has been determined, the interaction system 100 is activated to track the hand. In the embodiments of the present disclosure, there is no need to target the operating user by recognising a static gesture, the user only needs to make a hand action such as waving his/her hand in front of a camera for the interaction system 100 to be activated. The initialisation is sensitive and convenient for the user.

Figure 4:
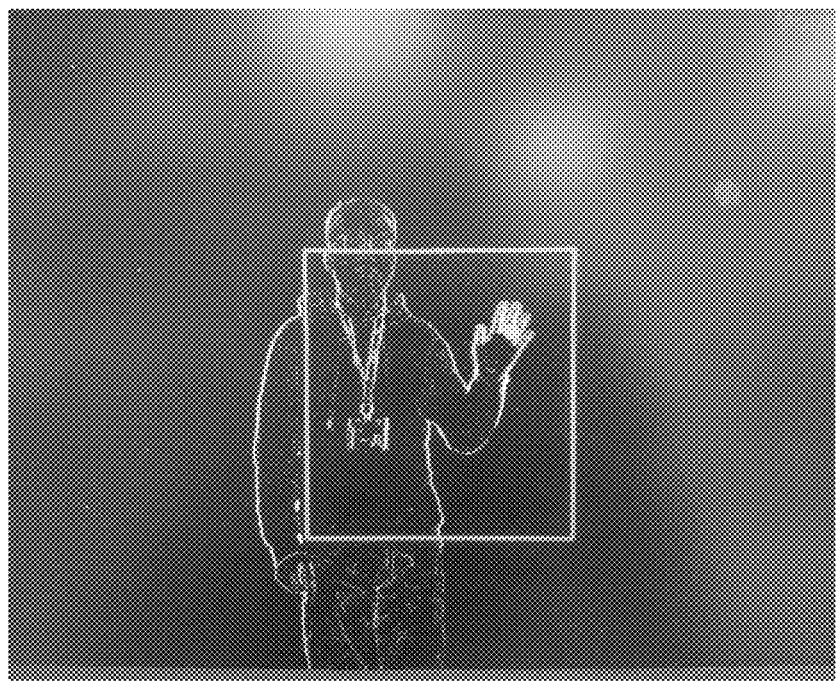
FIG. 4 is a schematic view showing an initialization result according to one embodiment of the present disclosure.

In some other embodiments of the present disclosure, in order to facilitate the user's operation, an operable region is arranged in accordance with the initial position of the hand. FIG. 4 shows an initialization result according to one embodiment of the present disclosure. As shown in FIG. 4, a bot represents the initial position of the hand, and a rectangular box surrounding the dot represents the operable region. Usually, the operable region is set in accordance with a size of the hand. In a possible embodiment of the present disclosure, a width of the operable region is, but not limited to, 4 times of the width of the hand detection region, and a height of the operable region is, but not limited to, 3.5 times of the height of the hand detection region. In addition, the operable region covers the hand and is located closer to a body of the user, so that the user merely moves the hand, without any exaggerated movement, to cover the entire operable region when the user is at a fixed position. It should be appreciated that, the size and position of the operable region in FIG. 4 are for illustrative purposes only, and the present disclosure is not limited thereto.

Based on the above-mentioned initialization result, the present disclosure further provides in some embodiments an event data flow-based hand tracking method, which includes the following steps.

Step S330: determining a hand measurement position in an initial frame in accordance with the initial position of the hand, the initial frame being a next event cumulative graph adjacent to an event cumulative graph corresponding to the initial position of the hand.

To be specific, Step S330 includes the following steps.

In a first step, a first search region is determined.

The first search region is determined in the initial frame in accordance with the initial position of the hand. In a possible embodiment of the present disclosure, a square region is generated in the initial frame with the initial position of the hand as a center and with a short side or a long side of the hand detection region being magnified by predetermined times as a side, so as to obtain the first search region. For example, the first search region is a square region with a side length as r pixels, where r is a predetermined multiple, i.e., 1.5 times, of a larger one of the length and width of the hand detection region.

In a second step, the first search region is updated.

The first search region is updated iteratively through determining whether event data in the initial frame is located within the first search region, so as to obtain at least one new first search region.

Whether each piece of event data in the initial frame is located within the first search region is determined in an output sequence of the pieces of event data (i.e., a chronological order of the timestamps in the pieces of the event data), and the quantity $n_{ir}$ of pieces of event data in the first search region is determined in real time.

An update frequency threshold f is set, and when the quantity of pieces of event data is greater than the update frequency threshold, the first search region is updated to obtain the new first search region. To be specific, when the quantity $n_{ir}$ of pieces of event data meets $n_{ir}>f$, with respect to the pieces of event data, a sum $x_{ir}$ of abscissae, a sum $y_{ir}$ of ordinates and the quantity $n_{ir}$ of pieces of event data are calculated, so as to determine coordinates (x, y) of a search center of the new first search region through $x=x_{ir}/n_{ir}$ and $y=y_{ir}/n_{ir}$.

The new first search region is generated in accordance with the coordinates of the search center, with its side length being equal to that of the first search region.

Next, whether the remaining event data in the initial frame (whether the remaining event data is located within the first search region has not been determined yet) is located within the new first search region is determined, and the quantity of pieces of event data within the new first search region is determined in real time. Identically, when the quantity of pieces of event data is greater than the update frequency threshold f, the new first search region is updated. The above steps, i.e., determining the quantity of pieces of event data within the new first search region, updating the first search region and determining the search center of the first search region, are performed iteratively until all the pieces of event data in the initial frame have been traversed.

Then, the set of first search regions are formed through the first search region and all the new first search regions.

In a third step, the hand measurement position is calculated.

The hand measurement position is determined in accordance with the quantity of all pieces of event data in the set of first search regions and the coordinate positions thereof.

More specifically, an average value of the coordinates of all the pieces of event data is calculated as the hand measurement position in accordance with the quantity of all pieces of event data in the set of first search regions and the coordinate positions thereof. The hand measurement position is calculated in accordance with a sum $X_a$ of abscissae and a sum $Y_a$ of ordinates of all pieces of event data in the set of first search regions, and the quantity $N_a$ of all pieces of event data in the set of first search regions through $z=[x,y]^T$, where $x=X_a/N_a$, $y=Y_a/N_a$, x represents the abscissa of the hand measurement position, y represents the ordinate of the hand measurement position, and $[\ ]^T$ represents transposition.

Step S340: determining a state vector indicating a movement state of the hand in each event cumulative graph in accordance with the initial position of the hand and the hand measurement position.

When tracking the hand, a state vector $x_f=[x, y, v_x, v_y]^T$ is defined to indicate the movement state of the hand, where x, y represent coordinates of the hand, and $v_x$ represents a speed of the hand in an x-axis direction, and $v_y$ represents a speed of the hand in a y-axis direction.

In a possible embodiment of the present disclosure, the hand is tracked through Kalman filtering as follows.

At first, a linear process model and a measurement model are established, i.e., $x_{k+1}=F_k+w_kx_k$, where $F_k$ represents a state transition matrix, $x_k$ represents a state vector at a time point k, $w_k$ represents a process noise following a normal probability distribution $P(w)\sim N(0,Q)$, Q represents a covariance matrix of the process noise; and $z_k=Hx_k+v_k$, where H a measurement matrix, $z_k$ represents a measurement value (i.e., the hand measurement position) at the time point k, $v_k$ represents a measurement noise following a normal probability distribution $P(v) \sim N(0,R)$, and R represents a covariance matrix of the measurement noise.

Next, the state vector of each event cumulative graph is calculated as follows.

(a) Determining a predicted state vector and the hand measurement position in the initial frame in accordance with the initial position of the hand and the hand measurement position.

In a possible embodiment of the present disclosure, an initial state vector $x_0 = [x, y, v_x, v_y]^T$ is set in accordance with the initial position of the hand, where x, y represents the initial position of the hand, and $v_x$, $v_y$ are both zero.

In the embodiments of the present disclosure, the predicted state vector at a next time point is predicted in accordance with the linear process model through $X_k' \leftarrow Fx_{k-1}$ and $P_k' \leftarrow FP_{k-1}F^T+Q$, where $X_{k-1}$ represents a state vector at a time point k−1, $x_k'$ represents a predicted state vector at a time point k, $P_{k-1}$ represents an optimum estimation error covariance at the time point k−1, and $P_k'$ represents a predicted state error covariance at the time point k. In other words, the predicted state vector $x_1'$ in the initial frame is predicted in accordance with the initial state vector $x_0$ through the above-mentioned formulae.

In addition, the hand measurement position determined in Step S330 is just the hand measurement position $z_1$ in the initial frame.

(b) Adjusting the predicted state vector $x_1'$ in the initial frame in accordance with the hand measurement position $z_1$ in the initial frame so as to obtain a state vector $x_1$ in the initial frame.

In the embodiments of the present disclosure, the predicted state vector is adjusted through $y_k \leftarrow z_k - Hx_k'$, $S_k \leftarrow HP_k'H^T+R$, $K_k \leftarrow P_k'H^TS_k^{-1}$, $x_k \leftarrow x_k' + K_ky_k$, and $P_k \leftarrow (I-K_kH)P_k'$, where $K_k$ represents that a Kalman gain at the time point k is used to minimize the estimation error covariance, and $(\ )^{-1}$ represents an inversion operation.

The description about optimum estimation may refer to relevant content about Kalman filtering, which will not be particularly defined herein.

(c) Calculating a predicted state vector and a hand measurement position in a current event cumulative graph with the initial frame as a start point in accordance with a state vector in a previous event cumulative graph.

On one hand, with reference to the calculation of the predicted state vector $x_1'$ in the initial frame in accordance with the initial state vector $x_0$ in (a), the predicted state vector $x_2'$ in the current event cumulative graph (i.e., a next event cumulative graph adjacent to the initial frame) is calculated in accordance with the state vector in the initial frame.

On the other hand, with reference to Step S330, the first search region is set in the current event cumulative graph with the hand measurement position in the initial frame as a center, and updated in accordance with the event data in the next event cumulative graph, so as to determine the hand measurement position $z_2$.

(d) Adjusting the predicted state vector $x_2'$ in the current event cumulative graph in accordance with the hand measurement position $z_2$ in the current event cumulative graph, so as to determine the state vector $x_2$ in the current event cumulative graph. A specific process may refer to the process of adjusting $x_1'$ in accordance with $z_1$ to obtain $x_1$ in (b), which will not be particularly defined herein.

(e) Performing the above steps (c) an (d) iteratively until the state vector in each event cumulative graph is determined. In other words, a predicted state vector $x_3'$ is calculated in accordance with a state vector $x_2$, $z_3$ is determined in accordance with the first search region and the new first search region, and then $x_3'$ is adjusted in accordance with $z_3$ to obtain $x_3, \ldots$, so as to finally determine the state vectors in all the event cumulative graphs.

According to the dynamic gesture tracking method 300 in the embodiments of the present disclosure, the energy density graph is generated in accordance with the event data flow, so as to determine a movement frequency of the hand, thereby to rapidly initialize the position of the hand. In addition, different from a conventional scheme where an object is tracked on the basis of frames (object detection and data association need to be performed), in the method 300, the object is tracked through a tracking algorithm based on the event data flow, so it is merely necessary to accurately track the object through calculation, without any necessity to perform the object detection and the data association.

Hence, through the dynamic gesture tracking method 300, it is able to track the object with a very small respond time and a low computation burden.

In some embodiments of the present disclosure, the hand may fail to be tracked due to shielding or an interference from an external environment. At this time, a resetting operation needs to be performed, or the position of the hand needs to be initialized again as follows.

1) Determining a Time Period in which the Hand Fails to be Tracked.

During the tracking, the hand is continuously detected in the vicinity of a tracking center (which is determined in accordance with the coordinate position of the event data corresponding to the state vector) through the target detection network. When the hand fails to be detected, it is considered that it is impossible to track the hand. A time threshold t1 is set, and when the hand fails to be detected within a time period greater than t1, the system enters a resetting mode.

2) Resetting the Position of the Hand.

After the system enters the resetting mode, the detection region is enlarged. In a possible embodiment of the present disclosure, the above-mentioned operable region serves as the enlarged detection region, and the hand is detected within the enlarged detection region through the target detection network. When the hand fails to be detected, a time period in which the hand fails to be detected may be determined. Otherwise, a distance between a previous tracking result and a center of each hand detection rectangle is calculated, and the center of the hand detection rectangle closest to the previous tracking result is selected to reset the position of the hand.

3) Performing Initialization Again.

In addition, a time threshold t2 may be further set, and when the time period in which the hand fails to be detected is greater than t2, it is considered that the hand fails to be tracked completely. At this time, a re-initialization mode is activated, and the initial position of the hand is determined again through the method 300.

Figure 5:
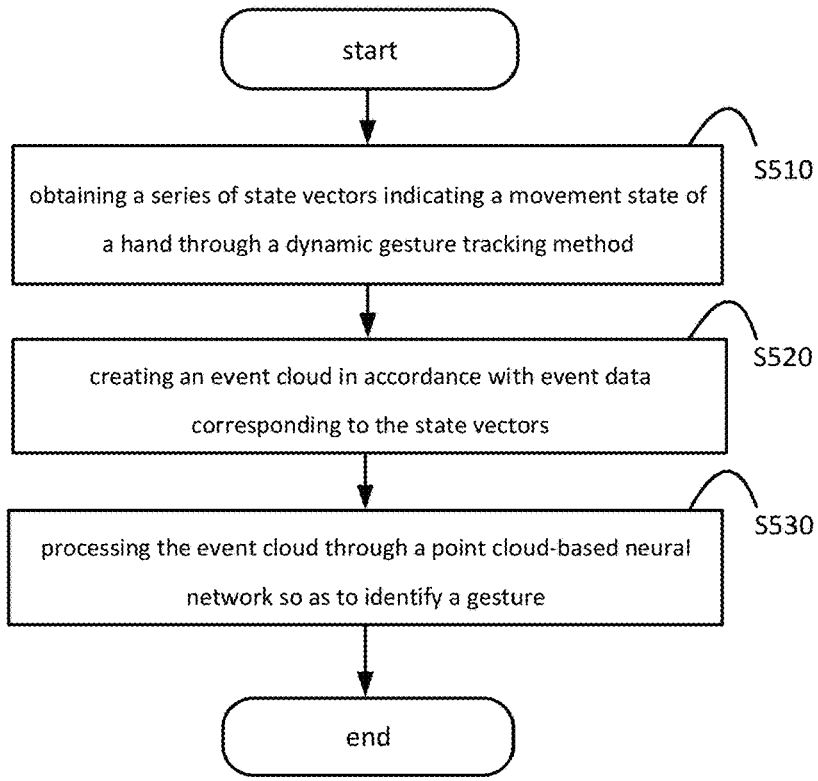
FIG. 5 is a flow chart of a dynamic gesture identification method 500 according to one embodiment of the present disclosure.

As shown in FIG. 5, the present disclosure further provides in some embodiments a dynamic gesture identification method 500, which is performed on the basis of the method 300. It should be appreciated that, the implementation of the method 500 may refer to those of the system 100 and the method 300, which will not be particularly defined herein. As shown in FIG. 5, the method 500 includes the following steps.

Step S510: obtaining a series of state vectors indicating a movement state of a hand through the above-mentioned dynamic gesture tracking method 300.

Step S520: creating an event cloud in accordance with event data corresponding to the state vectors.

As mentioned hereinabove, a state vector $x_f=[x, y, v_x, v_y]^T$ is used to indicate the movement state of the hand, where x,y represents a coordinate position of the hand corresponding to event data e(x, y, t). Hence, the event data is determined in accordance with the state vector.

In a possible embodiment of the present disclosure, an event vector corresponding to each event cumulative graph is generated in accordance with the event data corresponding to the state vector in the event cumulative graph. The generation of the event vector corresponding to one event cumulative graph will be described as follows.

A second search region is generated with the event data corresponding to the state vector in the event cumulative graph as a center. In a possible embodiment of the present disclosure, a width and a height of the second search region may be, but not limited to, two times of the width and the height of the first search region respectively. The event data in the second search region is sampled to obtain a second quantity of pieces of event data, i.e., the second quantity of pieces of event data are extracted from the second search region. Then, the event vector corresponding to the event cumulative graph is generated in accordance with the second quantity N of pieces of event data.

The event cloud is formed through a first quantity M of adjacent event vectors. In a possible embodiment of the present disclosure, the event cloud includes event vectors in first M−1 event cumulative graphs and event vectors in the current event cumulative graph, and the event cloud includes N*M pieces of event data. In other words, the event cloud always includes the event vectors in M event cumulative graphs immediately before the current event cumulative graph. The pieces of event data in the event cloud are arranged irregularly in a three-dimensional space with three axes, i.e., an X-axis, a Y-axis and a time axis.

All pieces of event data generated by one gesture are modeled to obtain a three-dimensional event cloud, so the identification of the gesture is equivalent to the identification of a geometric distribution of the event cloud, i.e., an object is identified through a three-dimensional point cloud.

Step S530: inputting the event cloud into a point cloud-based neural network, and processing the event cloud through the neural network to identify the gesture.

It should be appreciated that, a type of the point could-based neural network will not be particularly defined herein.

In a conventional scheme, static gestures are classified, and usually, a static gesture needs to be maintained for several seconds for the identification, so as to prevent the occurrence of any interference caused by similar gestures. However, in the dynamic gesture identification method 500 in the embodiments of the present disclosure, the event cloud is generated through the obtained event data, and then the dynamic gesture is identified in accordance with the point cloud rapidly. In addition, through identifying the dynamic gesture, it is also able to prevent the interference caused by similar gestures.

Figure 6:
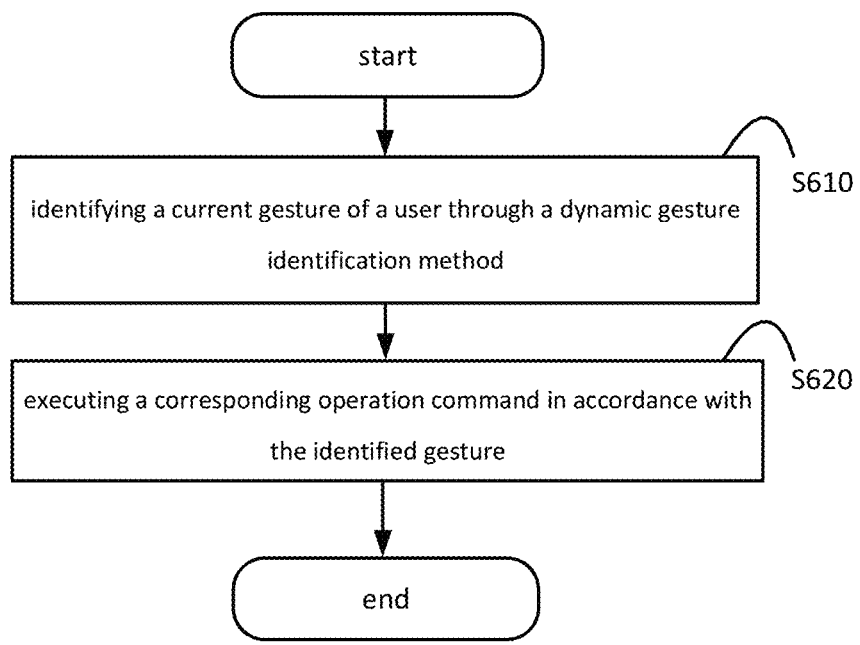
FIG. 6 is a flow chart of a gesture interaction method 600 according to one embodiment of the present disclosure.

As shown in FIG. 6, the present disclosure further provides in some embodiments a gesture interaction method 600 for the interaction system 100. The method 600 is performed on the basis of the method 300 and the method 500, and the implementation of the method 600 may refer to those of the method 300 and the method 500, which will not be particularly defined herein.

As shown in FIG. 6, the method 600 includes: Step S610 of identifying a current gesture of a user through the above-mentioned dynamic gesture identification method 500; and Step S620 of executing a corresponding operation command in accordance with the identified gesture.

After obtaining a gesture identification result, a corresponding operation is performed through a command control device. In the embodiments of the present disclosure, the dynamic gestures include waving up and down, waving side to side, rotating leftward and rotating rightward, which correspond to "enter", "return", "turn up" and "turn down" respectively.

Figure 7A:
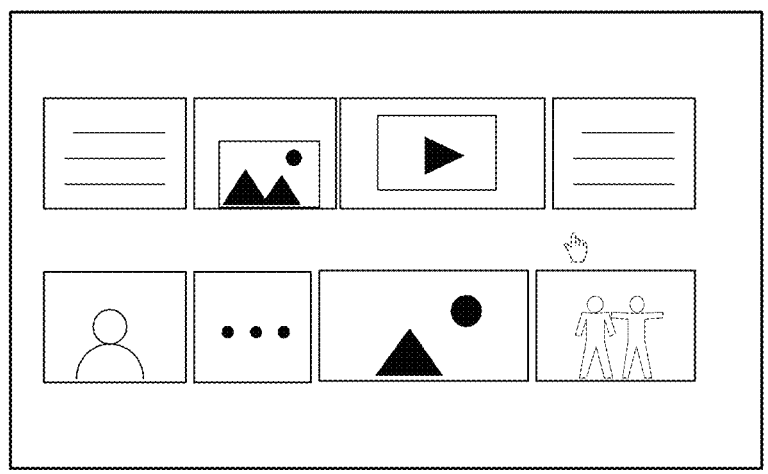
FIGS. 7A and 7B show an interface for gesture interaction according to one embodiment of the present disclosure.

FIG. 7A shows an interface for gesture interaction. After the interaction system 100 is activated, a cursor occurs on the interface, and the user may control the movement of the cursor like operating a mouse.

Figure 7B:
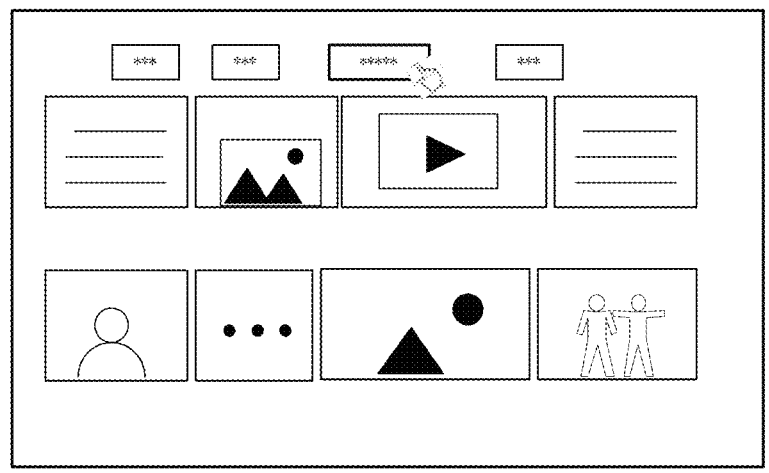

When the user rotates a wrist, a corresponding rotation angle is provided by the interaction system 100 to control the rolling of a menu bar on the interface, as shown in FIG. 7B. When a current menu is selected, a new interface occurs. When a specific item in the interface is selected, the user waves the hand up and down, so that the interaction system 100 determines a command corresponding to the current gesture as "enter", and then enters this item. When the user moves the hand from side to side, the interaction system 100 determines a command corresponding to the current gesture as "return", and then returns to a previous interface.

In addition, any other additional functions may also be defined in the interaction system 100 through rotating the hand to the left and rotating the hand to the right. For example, when the user rotates the hand to the right, a hidden menu bar is waken up, and when the user rotates the hand to the left, a volume adjustment function is waken up and the user moves the hand to control the volume adjustment.

It should be appreciated that, the above description is for illustrative purposes only, and the types and quantities of gestures as well as the operation commands corresponding to the gestures may be set according to the practical need.

According to the gesture interaction method in the embodiments of the present disclosure, the event cumulative graph merely including movement information is obtained in accordance with the event data from the DVS, so it is able to reduce a data volume, thereby to facilitate the storage and processing of the data. In addition, as compared with a conventional Complementary Metal Oxide Semiconductor (CMOS) camera, the DVS has lower power consumption. As compared with a conventional frame-based scheme, in the subsequent processing through an algorithm, a computation burden is smaller when the object is tracked and the gesture is identified based on the point cloud, so it is able to reduce the power consumption.

Figure 8:
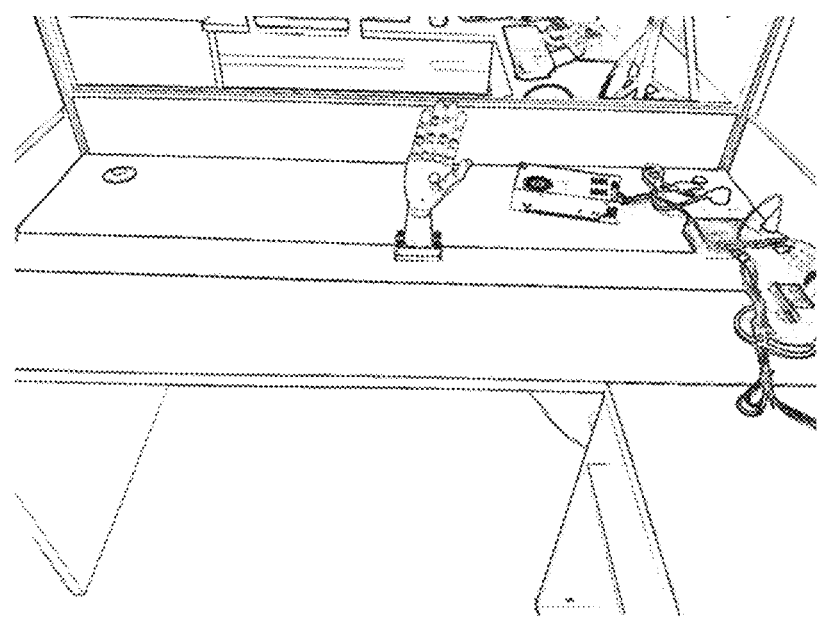
FIG. 8 is a schematic view showing a test platform according to one embodiment of the present disclosure.

Further, a testing procedure is designed hereinafter to verify the performance of the interaction system 100.
1) Module Testing In the embodiments of the present disclosure, as shown in FIG. 8, a testing platform is created to test tracking accuracy and validates the tracking robustness in a quantitative manner. A hand model is installed on a sliding rail to simulate the normal movement of the hand. A center of the hand model is a center of an image collected by a camera, and a movement direction of the hand model is parallel to a horizontal axis of the camera. A position of the center of the hand model is taken as a true value of the position of the hand model. It is found through experiments at different speeds that, the distribution is more divergent when the hand model is tracked at a high speed.

A standard difference between the true value and a tracking result is calculated. Experiments show that, the standard difference in each direction is relatively small at a low speed, i.e., the hand model is tracked in a stable manner. The standard interference increases along with an increase in the movement speed of the hand model. However, event in the case of a large standard difference in a horizontal direction at a high speed, the hand model is always tracked during the experiment.

In addition, the influence of a denoising operation and a smoothing operation on the tracking accuracy is analyzed. At a low speed, a small influence is caused by the denoising operation and smoothing operation on the standard difference in the horizontal direction. It is considered that, hysteresis occurs for the tracking result due to the smoothing operation, so the standard difference in the horizontal direction increases rapidly. The standard difference in a longitudinal direction is stable at any speed. The tracking robustness is tested in the case of interferences from a background and light. It is found that, the standard difference increases slightly, but it is still within an appropriate range.

In addition, different persons are invited to perform the gesture identification and the robustness test, and identification results for four types of gestures are collected. As compared with the true value, the identification accuracy is more than 95%. Further, the robustness test is performed in different backgrounds and lightening conditions, and testing results show that the identification accuracy is still more than 90%, although it decreases slightly due to the external interference.

2) User Acceptance Testing

Fifty users are invited to use the interaction system 100. It is found that, the users use the interaction system 100 easily at a low learning cost, and the interaction system 100 has very a very rapid response time.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be further appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A dynamic gesture tracking method, comprising:
processing an event data flow from a dynamic vision sensor at a predetermined time interval so as to generate a series of event cumulative graphs;
determining an initial position of a hand in accordance with the event cumulative graphs;
determining a hand measurement position in an initial frame in accordance with the initial position of the hand, the initial frame being a next event cumulative graph adjacent to an event cumulative graph corresponding to the initial position of the hand; and
determining a state vector indicating a movement state of the hand in each event cumulative graph in accordance with the initial position of the hand and the hand measurement position,
wherein the processing the event data flow from the dynamic vision sensor at the predetermined time interval so as to generate a series of event cumulative graphs comprises: dividing the event data flow from the dynamic vision sensor at the predetermined time interval so as to obtain a plurality of data segments; and generating the event cumulative graph in accordance with event data in each data segment, wherein the event data is triggered by movement of an object in a field of view relative to the dynamic vision sensor, and the event data comprises a coordinate position and a timestamp of a triggered event, wherein the generating the event cumulative graph in accordance with the event data in each data segment comprises: creating an initial image having a predetermined size, and assigning pixel values of the initial image as zero, the predetermined size being determined in accordance with a size of a pixel unit array of the dynamic vision sensor; determining the quantity of times for which an event at a same position as a coordinate position of each pixel in the initial image is triggered within the data segment; and updating a pixel value of each pixel in accordance with the quantity of times, so as to generate the event cumulative graph, wherein the determining the initial position of the hand in accordance with the event cumulative graphs comprises: determining a high-energy density point in a current event cumulative graph; determining at least one hand detection region in the event cumulative graph through a target detection network; generating at least one rectangular region with the high-energy density point as a center in accordance with a size of the hand detection region; calculating an overlapping ratio of the rectangular region to the hand detection region; in the case that the overlapping ratio is greater than a predetermined value, taking a position where the high-energy density point is located as the initial position of the hand; and in the case that the overlapping ratio is not greater than the predetermined value, calculating a high-energy density point and a hand detection region in a next event cumulative graph, and determining the initial position of the hand in accordance with an overlapping ratio of the hand detection region to the rectangular region.

2. The dynamic gesture tracking method according to claim 1, wherein the determining the high-energy density point in the current event cumulative graph comprises:

generating an energy density graph in accordance with the current event cumulative graph and at least one event cumulative graph adjacent to the current event cumulative graph;

dividing the energy density graph into a plurality of regions having a same size;

determining an energy density in each region in accordance with a sum of pixel values in the region and the quantity of non-zero pixels;

removing regions where the energy density does not meet a predetermined condition from the regions, so as to obtain remaining regions; and selecting a region having a largest energy density in the remaining regions, and calculating an average value of coordinate values of the pixels in the region as the high-energy density point.

3. The dynamic gesture tracking method according to claim 1, wherein the determining the hand measurement position in the initial frame in accordance with the initial position of the hand comprises:

determining a first search region in the initial frame in accordance with the initial position of the hand;

updating the first search region iteratively through determining whether event data in the initial frame is located within the first search region, so as to obtain at least one new first search region;

obtaining a set of first search regions in accordance with the first search region and all the new first search regions; and determining the hand measurement position in accordance with the quantity of all event data in the set of first search regions and coordinate positions of the event data.

4. The dynamic gesture tracking method according to claim 3, wherein the updating the first search region iteratively through determining whether the event data in the initial frame is located within the first search region so as to obtain at least one new first search region comprises:

determining whether each piece of event data in the initial frame is located within the first search region in an output sequence of the pieces of event data, and determining in real time the quantity of pieces of event data in the first search region;

in the case that the quantity of pieces of event data in the first search region is greater than an update frequency threshold, updating the first search region so as to obtain the new first search region and a search center; and determining whether the other pieces of event data in the initial frame is located within the new first search region, and determining the quantity of pieces of event data in the new first search region until all pieces of event data in the initial frame have been traversed.

5. The dynamic gesture tracking method according to claim 3, wherein the determining the hand measurement position in accordance with the quantity of all event data in the set of first search regions and coordinate positions of the event data comprises determining an average value of the coordinate positions of the event data as the hand measurement position in accordance with the quantity of all event data in the set of first search regions and coordinate positions of the event data.

6. The dynamic gesture tracking method according to claim 3, wherein the determining the first search region in the initial frame in accordance with the initial position of the hand comprises generating a square region in the initial frame with the initial position of the hand as a center and with a short side or a long side of the hand detection region being magnified by predetermined times as a side, so as to obtain the first search region.

7. The dynamic gesture tracking method according to claim 1, wherein the determining the state vector indicating the movement state of the hand in each event cumulative graph in accordance with the initial position of the hand and the hand measurement position comprises:

determining a predicted state vector and a hand measurement position in the initial frame in accordance with the initial position of the hand and the hand measurement position;

adjusting the predicted state vector in the initial frame in accordance with the hand measurement position in the initial frame, so as to obtain a state vector in the initial frame;

calculating a predicted state vector and a hand measurement position in a current event cumulative graph with the initial frame as a start point in accordance with a state vector in a previous event cumulative graph; and adjusting the predicted state vector in the current event cumulative graph in accordance with the hand measurement position in the current event cumulative graph, until the state vector is determined in each event cumulative graph.

8. A dynamic gesture identification method, comprising:

obtaining a series of state vectors indicating a movement state of a hand through the dynamic gesture tracking method according to claim 1;

creating an event cloud in accordance with event data corresponding to the state vectors; and processing the event cloud through a point cloud-based neural network so as to identify a gesture.

9. The dynamic gesture identification method according to claim 8, wherein the creating the event cloud in accordance with the event data corresponding to the obtain state vectors comprises:
generating an event vector corresponding to each event cumulative graph in accordance with the event data corresponding to the state vector; and
creating the event cloud through a first quantity of adjacent event vectors.

10. The dynamic gesture identification method according to claim 9, wherein the generating the event vector corresponding to each event cumulative graph in accordance with the event data corresponding to the state vector comprises:
generating a second search region with the event data corresponding to the state vector as a center;
sampling event data in the second search region so as to obtain a second quantity of pieces of event data; and
generating the event vector corresponding to each event cumulative graph in accordance with the second quantity of pieces of event data.

11. A gesture interaction method, comprising:
identifying a current gesture of a user through the dynamic gesture identification method according to claim 8; and
executing a corresponding operation command in accordance with the identified gesture.

12. An interaction system, which is configured to execute the gesture interaction method according to claim 11, comprising:
a dynamic vision sensor configured to trigger an event in accordance with movement of an object in a field of view relative to the dynamic vision sensor, and output an event data flow;
a hand detection module configured to process the received event data flow to determine an initial position of a hand;
a hand tracking module configured to determine a series of state vectors indicating a movement state of the hand in the event data flow in accordance with the initial position of the hand;
a gesture identification module configured to create an event cloud in accordance with event data corresponding to each state vector, and process the event cloud through a point cloud-based neural network, so as to identify a gesture; and
a command execution module configured to execute a corresponding operation command in accordance with the gesture.

13. The interaction system according to claim 12, wherein the hand detection module is further configured to generate a detection region for detecting the hand in accordance with the state vector.

14. The interaction system according to claim 13, further comprising a resetting module configured to, in the case that the hand fails to be detected by the hand detection module within a predetermined time period, indicate the hand detection module to enlarge the detection region, and in the case that the hand has been detected, reset the initial position of the hand.

15. An intelligent device, comprising the interaction system according to claim 12.

16. A computing device, comprising one or more processors, a memory, and one or more programs stored in the memory and executed by the one or more processors, wherein the one or more programs is executed by the one or more processors so as to implement the dynamic gesture tracking method according to claim 1.

17. A non-transitory computer-readable storage medium storing therein one or more programs, wherein the one or more programs is executed by a computer so as to implement the dynamic gesture tracking method according to claim 1.

* * * * *